US 6,862,176 B1

(12) United States Patent
Codilian et al.

(10) Patent No.: US 6,862,176 B1
(45) Date of Patent: Mar. 1, 2005

(54) DISK DRIVE COVER FOR USE WITH A DISK DRIVE TO PROVIDE FOR DISK SHROUDING AND HEAT DISSIPATION

(75) Inventors: Raffi Codilian, Irvine, CA (US); Dalwinder Singh, Irvine, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 60 days.

(21) Appl. No.: 10/608,874

(22) Filed: Jun. 27, 2003

(51) Int. Cl.[7] .................................................. G06F 1/16
(52) U.S. Cl. ..................... 361/685; 360/97.02; 369/263
(58) Field of Search ................................ 361/685–687, 361/724–727; 360/48, 77.08, 77.02, 77.01, 77.06, 97.01–97.04; 369/263, 275.5; 312/223.3–223.7

(56) References Cited

U.S. PATENT DOCUMENTS

| | | | |
|---|---|---|---|
| 6,657,801 B1 | * | 12/2003 | Chue et al. .................... 360/48 |
| 6,707,637 B1 | * | 3/2004 | Codilian et al. ......... 360/98.08 |
| 6,728,062 B1 | * | 4/2004 | Ou-Yang et al. ......... 360/97.02 |
| 2004/0169961 A1 | * | 9/2004 | Lin et al. ..................... 360/265 |

* cited by examiner

Primary Examiner—Hung Van Duong
(74) Attorney, Agent, or Firm—Milad G. Shara, Esq.; Blakely, Sokoloff, Taylor & Zafman

(57) ABSTRACT

Disclosed is a disk drive cover that provides improved disk shrouding and heat dissipation. Part of the cover is recessed relative to the rest and may be substantially circular. The recessed portion may be located approximately adjacent to at least one disk and may be substantially coextensive with at least one disk. Further, the internal side of the recessed portion may be at a vertical depth sufficient enough to shroud at least one disk. Additionally, the recessed portion may further include at least a member that projects from the external side of the recessed portion, such as approximately arcuate-shaped members or approximately rectangular-shaped members, to aid in heat dissipation.

62 Claims, 6 Drawing Sheets

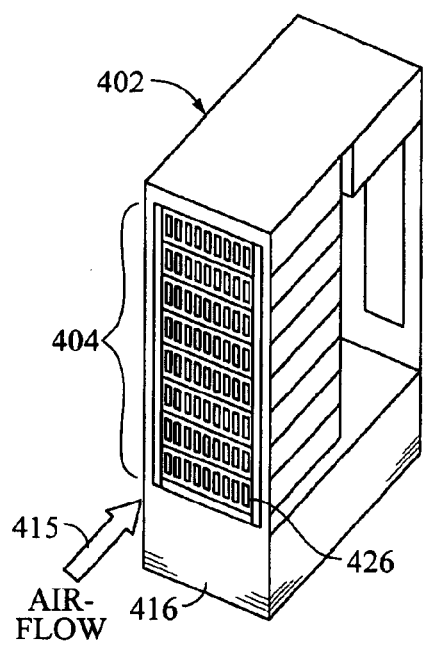
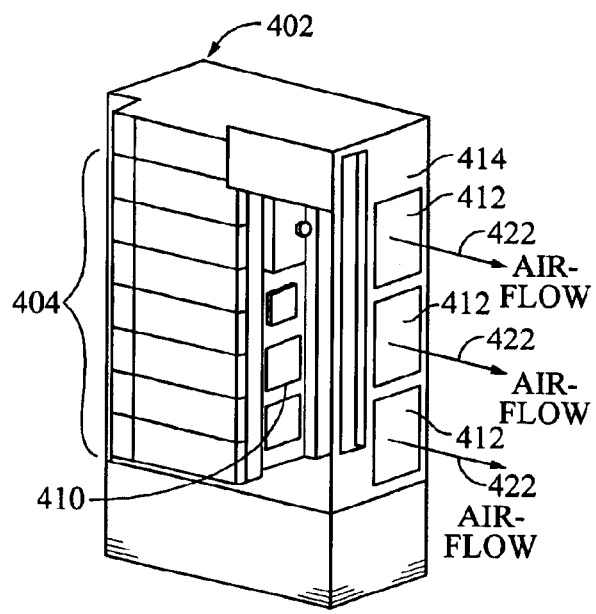
FIG. 4A
FIG. 4B
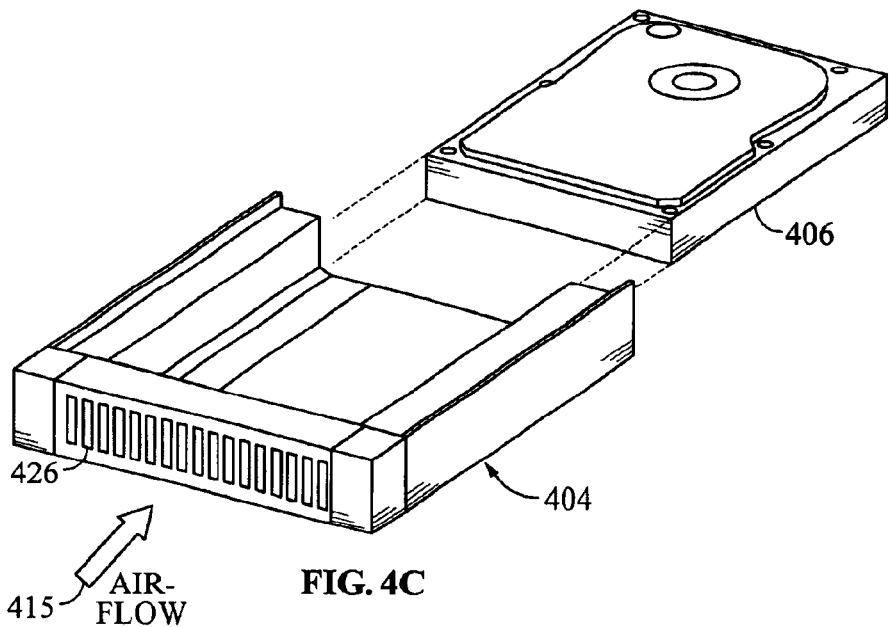
FIG. 4C

DISK DRIVE COVER FOR USE WITH A DISK DRIVE TO PROVIDE FOR DISK SHROUDING AND HEAT DISSIPATION

BACKGROUND OF THE INVENTION

1. Field of the Invention

The present invention relates to a disk drive cover for use with a disk drive. More particularly, the present invention relates to a disk drive cover for use with a disk drive that provides for disk shrouding and heat dissipation.

2. Description of the Prior Art and Related Information

A huge market exists for hard disk drives for mass-market host computer systems such as servers, desktop computers, and laptop computers. To be competitive in this market, a hard disk drive should be relatively inexpensive, and should accordingly embody a design that is adapted for low-cost mass production. Further, there exists substantial competitive pressure to continually develop hard disk drives that have increasingly higher storage capacity, that provide for faster access to data, and at the same time conform to decreasingly smaller exterior sizes and shapes often referred to as "form factors." Specific methods that are presently being employed to decrease access times to data are to increase the rotational speed of the disk(s) of the disk drive, and to increase the current provided to the actuator assembly in order to move the head of the actuator assembly to the desired data more quickly.

As previously discussed, one particular method that is presently being employed to decrease access times to data is to increase the rotational speed of the disk(s) of the disk drive. Although increasing the rotational speed of the disks of the disk drive advantageously decreases access time to data, or latency times (i.e. time spent waiting for a selected data block to reach the head as a particular disk rotates), higher rotational speeds tend to induce a greater degree of turbulence in the airflow established by the rotating disks. It is desirable to have laminar or uniform airflow about the disks, the head stack assembly (HSA), and the heads, of the disk drive, as opposed to turbulent airflow. Turbulent airflow is characterized by random fluctuations in the speed and direction of the airflow. Such turbulence can cause unwanted vibration of the disks and the heads, leading to undesirable track misregistration errors (TMRs). Also, increasing the rotational speed of the disks of the disk drive by increasing the amount of power to the spindle motor further results in increased temperatures within the disk drive.

Additionally, as previously discussed, another particular method that is presently being employed to decrease access times to data is to increase the current provided to the actuator assembly in order to move the head of the actuator assembly to the desired data more quickly. However, this technique also results in increased temperatures within the disk drive.

Unfortunately, if disk drives are not adequately cooled and temperatures become to high within the disk drive, this may cause the disk drive to function sub-optimally, and in extreme cases may even result in damage to the components of the disk drive, thus making the disk drive non-functional. Further, multiple disk drives are now being commonly mounted next to one another in a disk stack chassis, especially in today's server environments. In a disk stack chassis, disk drives are typically mounted in disk bays in horizontal or vertical arrangements in very close proximity to one another, which generates a large amount of heat that may degrade disk drive performance. Although cooling fans are typically used in a disk drive chassis to induce air-flow about the disk drives, and to aid in heat dissipation, the potential overheating of disk drives within the disk drive chassis is still a problem.

For the most part, prior covers and bases for disk drives, by themselves, have not been adequately designed to optimize heat dissipation to decrease temperatures within stacked disk drives of a disk drive chassis, nor to address issues related to turbulent airflow within the disk drive itself. For example, as shown in FIG. 1, a conventional cover 10 and base 12 for a disk drive merely consist of flat planar surfaces 14 to house the components of the disk drive.

SUMMARY OF THE INVENTION

The present invention relates to a disk drive cover for use with a disk drive. More particularly, the present invention relates to a disk drive cover for use with a disk drive that provides for disk shrouding and heat dissipation.

In one aspect, the invention may be regarded as a cover for use with a disk drive. The disk drive includes the cover, a base, at least one disk mounted to a spindle motor for rotation within the disk drive, and a head stack assembly (HSA) including an actuator assembly pivotally coupled to the base of the disk drive to support at least one head for writing and reading data to and from the at least one disk. The cover mounts to the base and includes a first cover portion and a second cover portion. The first cover portion has an external side and an internal side. The second cover portion also has an external side and an internal side and is disposed within the first cover portion. Particularly, the second cover portion is recessed relative to the first cover portion. The recessed second cover portion may be located approximately adjacent to the at least one disk and may be substantially coextensive with the at least one disk. Further, the internal side of the recessed second portion may face the at least one disk and may be closer to the at least one disk than the internal side of the first cover portion.

For example, in some embodiments, the recessed second cover portion may be substantially circular or may be substantially polygonal. In one embodiment, the internal side of the recessed second cover portion is at a vertical depth sufficient enough to shroud the at least one disk. In one particular embodiment, the external side of the recessed second cover portion is at least one millimeter vertically distant from the external side of the first cover portion. In another particular embodiment, the external side of the recessed second cover portion is at least two millimeters vertically distant from the external side of the first cover portion.

In some embodiments, the recessed second cover portion may further include at least one member that projects from the external side of the recessed second cover portion to aid in heat dissipation. For example, the at least one member may include an approximately arcuate-shaped member to aid in heat dissipation. In another example, the at least one member may include an approximately rectangular-shaped member to aid in heat dissipation. In one particular embodiment, a plurality of approximately rectangular-shaped members may project from the external side of the recessed second cover portion to form a plurality of air-flow channels to aid in heat dissipation.

In more detailed embodiments, the external side of the first cover portion may include at least one channel having at most the same depth as the recessed second cover portion, wherein the channel extends from a side of the cover to the recessed second cover portion. Further, the channel may be disposed within a respective complementary channel-accommodating slot formed within a respective sidewall of the base such that at least one member of the recessed second cover portion, through the at least one channel, is in air-flow communication with air flowing about the cover and the base to aid in heat dissipation. In a particular example, the channel may be disposed within a respective complementary channel accommodating slot formed with a respective sidewall of the base such that a plurality of approximately rectangular-shaped members of the recessed second cover portion, through the at least one channel, is in air-flow communication with air flowing about the cover and the base to aid in heat dissipation.

In other embodiments, the base may include a bottom side having a base channel formed therein. The base channel may extend from a front end of the base toward the back end of the base and a printed circuit board assembly (PCBA) of the disk drive such that the base channel is in air-flow communication with air flowing about the base from at least the front end of the base to aid in heat dissipation. Moreover, the bottom side of the base may further include at least one side channel extending from a sidewall of the base to the base channel such that the base channel is in air-flow communication with air flowing about the base from at least the front end of the base and at least one of the sides of the base to aid in heat dissipation.

In some embodiments, the at least one member that projects from the external side of the recessed second cover portion to aid in heat dissipation may be integrally formed with the recessed second cover portion. In other embodiments, the at least one member that projects from the external side of the recessed second cover portion to aid in heat dissipation may be attachable to the recessed second cover portion. Further, the cover mounted to the base to form a housing of the disk drive may be compatible with a small form factor standard. For example, the small form factor standard may be compatible with the Small Form Factor (SFF)-8301 Specification for a Form Factor of 3.5" disk drives.

In another aspect of the invention, the invention may also be regarded as a cover for use with a disk drive. The disk drive includes the cover, a base, at least one disk mounted to a spindle motor for rotation within the disk drive, and a head stack assembly (HSA) including an actuator assembly pivotally coupled to the base of the disk drive to support at least one head for writing and reading data to and from the at least one disk. The cover mounts to the base and includes a first cover portion and a second cover portion. The first cover portion has an external side and an internal side. The second cover portion has an external side and an internal side and is disposed within the first cover portion. Particularly, the second cover portion is recessed relative to the first cover portion. The recessed second cover portion may be located approximately adjacent to the at least one disk and may be substantially coextensive with the at least one disk. Further, the external side of the first cover portion may include a plurality of channels having at most the same depth as the recessed second cover portion. Each channel may extend from a side of the cover to the recessed second cover portion and may be disposed within a respective complementary channel-accommodating slot formed within a respective sidewall of the base. Moreover, at least one of the channels extends from a different side of the cover than one of the other channels to create at least two different channels such that the recessed second cover portion is in air-flow communication with air flowing about the cover from at least two different sides of the cover through the at least two different channels to aid in heat dissipation.

For example, in some embodiments, the recessed second cover portion may be substantially circular or may be substantially polygonal. Further, a back end channel may be coupled to one of the at least two different channels. The back end channel may be disposed within a complementary back end channel-accommodating slot formed within a back end sidewall of the base. In some embodiments, one of the channels may extend between different sides of the cover but not through the recessed second cover portion itself.

Furthermore, in some embodiments, the base may include a bottom side having a base channel formed therein. The base channel may extend from a front end of the base towards the back end of the base and a printed circuit board assembly (PCBA) of the disk drive such that the base channel is in air-flow communication with air flowing about the base from at least the front end of the base to aid in heat dissipation. Moreover, the bottom side of the base may further include at least one side channel extending from a sidewall of the base to the base channel such that the base channel is in air-flow communication with air flowing about the base from at least the front end of the base and at least one of the sides of the base to aid in heat dissipation.

In some embodiments, the recessed second cover portion may further include at least one member that projects from the external side of the recessed second cover portion to aid in heat dissipation. For example, the at least one member may include an approximately arcuate-shaped member to aid in heat dissipation. In another example, the at least one member may include an approximately rectangular-shaped member to aid in heat dissipation. In one particular embodiment, a plurality of approximately rectangular-shaped members may project from the external side of the recessed second cover portion to form a plurality of air-flow channels to aid in heat dissipation.

In some particular embodiments, the at least one member that projects from the external side of the recessed second cover portion to aid in heat dissipation may be integrally formed with the recessed second cover portion. In other embodiments, the at least one member that projects from the external side of the recessed second cover portion to aid in heat dissipation may be attachable to the recessed second cover portion. Further, the cover mounted to the base to form a housing of the disk drive may be compatible with a small form factor standard. For example, the small form factor standard may be compatible with the Small Form Factor (SFF)-8301 Specification for a Form Factor of 3.5" disk drives.

In another aspect, the invention may be regarded as a disk drive. The disk drive includes a cover, a base, at least one disk mounted to a spindle motor for rotation within the disk drive, and a head stack assembly (HSA) including an actuator assembly pivotally coupled to the base of the disk drive to support at least one head for writing and reading data to and from the at least one disk. The cover mounts to the base and includes a first cover portion and a second cover portion. The first cover portion has an external side and an internal side. The second cover portion also has an external side and an internal side and is disposed within the first cover portion. Particularly, the second cover portion is recessed relative to the first cover portion. The recessed second cover portion may be located approximately adjacent to the at least one disk and may be substantially coextensive with the at least one disk. Further, the internal side of the recessed second portion may face the at least one disk and may be closer to the at least one disk than the internal side of the first cover portion.

For example, in some embodiments, the recessed second cover portion may be substantially circular or may be substantially polygonal. In one embodiment, the internal side of the recessed second cover portion is at a vertical depth sufficient enough to shroud the at least one disk. In one particular embodiment, the external side of the recessed second cover portion is at least one millimeter vertically distant from the external side of the first cover portion. In another particular embodiment, the external side of the recessed second cover portion is at least two millimeters vertically distant from the external side of the first cover portion.

In some embodiments, the recessed second cover portion may farther include at least one member that projects from the external side of the recessed second cover portion to aid in heat dissipation. For example, the at least one member may include an approximately arcuate-shaped member to aid in heat dissipation. In another example, the at least one member may include an approximately rectangular-shaped member to aid in heat dissipation. In one particular embodiment, a plurality of approximately rectangular-shaped members may project from the external side of the recessed second cover portion to form a plurality of air-flow channels to aid in heat dissipation.

In more detailed embodiments, the external side of the first cover portion may include at least one channel having at most the same depth as the recessed second cover portion, wherein the channel extends from a side of the cover to the recessed second cover portion. Further, the channel may be disposed within a respective complementary channel-accommodating slot formed within a respective sidewall of the base such that the at least one member of the recessed second cover portion, through the at least one channel, is in air-flow communication with air flowing about the cover and the base to aid in heat dissipation. In a particular example, the channel may be disposed within a respective complementary channel-accommodating slot formed with a respective sidewall of the base such that a plurality of approximately rectangular-shaped members of the recessed second cover portion, through the at least one channel, is in air-flow communication with air flowing about cover in base to aid in heat dissipation.

In other embodiments, the base may include a bottom side having a base channel formed therein. The base channel may extend from a front end of the base toward the back end of the base and a printed circuit board assembly (PCBA) of the disk drive such that the base channel is in air-flow communication with air flowing about the base from at least the front end of the base to aid in heat dissipation. Moreover, the bottom side of the base may further include at least one side channel extending from a sidewall of the base to the base channel such that the base channel is in air-flow communication with air flowing about the base from at least the front end of the base and at least one of the sides of the base to aid in heat dissipation.

In some embodiments, the at least one member that projects from the external side of the recessed second cover portion to aid in heat dissipation may be integrally formed with the recessed second cover portion. In other embodiments, the at least one member that projects from the external side of the recessed second cover portion to aid in heat dissipation may be attachable to the recessed second cover portion. Further, the cover mounted to the base to form a housing of the disk drive may be compatible with a small form factor standard. For example, the small form factor standard may be compatible with the Small Form Factor (SFF)-8301 Specification for a Form Factor of 3.5" disk drives.

In yet a further aspect of the invention, the invention may also be regarded a disk drive. The disk drive includes a cover, a base, at least one disk mounted to a spindle motor for rotation within the disk drive, and a head stack assembly (HSA) including an actuator assembly pivotally coupled to the base of the disk drive to support at least one head for writing and reading data to and from the at least one disk. The cover mounts to the base and includes a first cover portion and a second cover portion. The first cover portion has an external side and an internal side. The second cover portion has an external side and an internal side and is disposed within the first cover portion. Particularly, the second cover portion is recessed relative to the first cover portion. The recessed second cover portion may be located approximately adjacent to the at least one disk and may be substantially coextensive with the at least one disk. Further, the external side of the first cover portion may include a plurality of channels having at most the same depth as the recessed second cover portion. Each channel may extend from a side of the cover to the recessed second cover portion and may be disposed within a respective complementary channel-accommodating slot formed within a respective sidewall of the base. Moreover, at least one of the channels extends from a different side of the cover than one of the other channels to create at least two different channels such that the recessed second cover portion is in air-flow communication with air flowing about the cover from at least two different sides of the cover through the at least two different channels to aid in heat dissipation.

For example, in some embodiments, the recessed second cover portion may be substantially circular or may be substantially polygonal. Further, a back end channel may be coupled to one of the at least two different channels. The back end channel may be disposed within a complementary back end channel-accommodating slot formed within a back end sidewall of the base. In some embodiments, one of the channels may extend between different sides of the cover but not through the recessed second cover portion itself.

Furthermore, in some embodiments, the base may include a bottom side having a base channel formed therein. The base channel may extend from a front end of the base towards the back end of the base and a printed circuit board assembly (PCBA) of the disk drive such that the base channel is in air-flow communication with air flowing about the base from at least the front end of the base to aid in heat dissipation. Moreover, the bottom side of the base may further include at least one side channel extending from a sidewall of the base to the base channel such that the base channel is in air-flow communication with air flowing about the base from at least the front end of the base and at least one of the sides of the base to aid in heat dissipation.

In some embodiments, the recessed second cover portion may further include at least one member that projects from the external side of the recessed second cover portion to aid in heat dissipation. For example, the at least one member may include an approximately arcuate-shaped member to aid in heat dissipation. In another example, the at least one member may include an approximately rectangular-shaped member to aid in heat dissipation. In one particular embodiment, a plurality of approximately rectangular-shaped members may project from the external side of the recessed second cover portion to form a plurality of air-flow channels to aid in heat dissipation.

In some particular embodiments, the at least one member that projects from the external side of the recessed second cover portion to aid in heat dissipation may be integrally formed with the recessed second cover portion. In other embodiments, the at least one member that projects from the external side of the recessed second cover portion to aid in heat dissipation may be attachable to the recessed second cover portion. Further, the cover mounted to the base to form a housing of the disk drive may be compatible with a small form factor standard. For example, the small form factor standard may be compatible with the Small Form Factor (SFF)-8301 Specification for a Form Factor of 3.5" disk drives.

The forgoing and other features of the invention are described in detail below and are set forth in the appended claims.

BRIEF DESCRIPTION OF THE DRAWINGS

FIG. 4A is a front perspective view of an example of a conventional disk stack chassis.

FIG. 4B is a back perspective view of the example of the conventional disk stack chassis.

FIG. 4C is a front perspective view of a conventional disk bay in which a disk drive having a cover including shrouding and heat dissipation features, according to embodiments of the present invention, may be mounted.

DETAILED DESCRIPTION

The present invention relates to a disk drive cover for use with a disk drive. More particularly, the present invention relates to a disk drive cover for use with a disk drive that provides for disk shrouding and heat dissipation.

Figure 1:
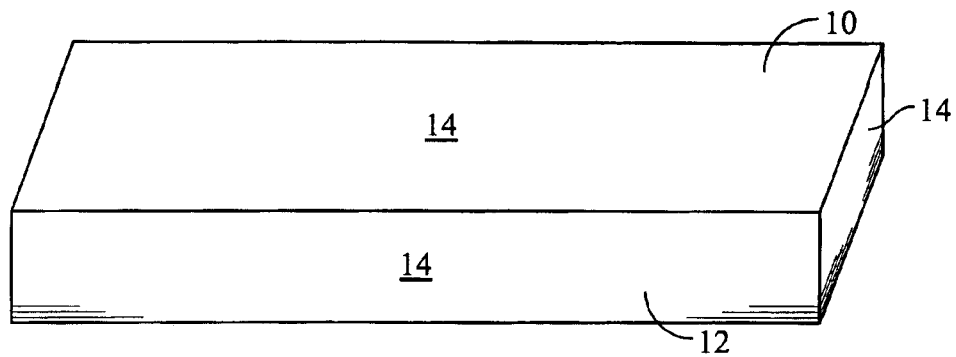
FIG. 1 is a perspective view of a conventional cover and base for a disk drive having flat planar surfaces to house the components of the disk drive.
Figure 2A:
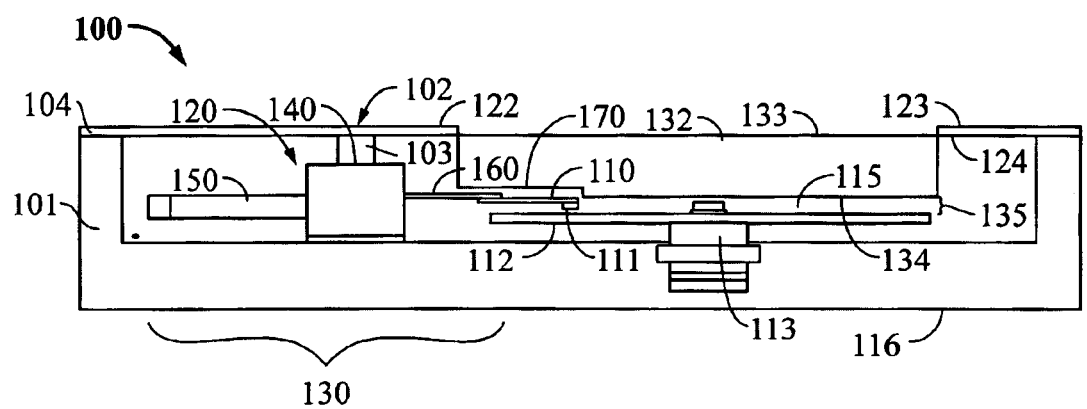
FIG. 2A is a side-sectional view of a hard disk drive (HDD), which includes a disk drive cover that provides for disk shrouding, and in some embodiments heat dissipation, according to one embodiment of the present invention.

With reference now to FIG. 2A, FIG. 2A is a side-sectional view of a hard disk drive (HDD) 100, which includes a disk drive cover 102 that provides for disk shrouding, and in some embodiments heat dissipation, according to embodiments of the present invention. The disk drive 100 includes a head disk assembly (HDA) 101 and a printed circuit board assembly (PCBA) (not shown). As is known, the PCBA includes circuitry for processing signals and controlling the operations of the disk drive. The HDA 101 includes a base 116 and a disk drive cover 102 that may be attached to the base 116 to collectively house either a single disk 112 or a disk stack including multiple disks, a spindle motor 113 attached to the base 116 for rotating the disk 112 (or disk stack), a head stack assembly (HSA) 120, and a pivot bearing cartridge (such as a stainless steel pivot bearing cartridge, for example) that rotatably supports the HSA 120 on the base 116. The base 116 is typically attached to the cover 102 by means of screws or other discrete fasteners. The spindle motor 113 rotates the disk 112 or disk stack at a constant angular velocity about a spindle motor rotation axis. Further, each disk utilized may include a plurality of recording surfaces for writing or reading data to or from the disk.

The HSA 120 comprises a swing-type or rotary actuator assembly 130, at least one head gimbal assembly (HGA) 110, and a flex circuit cable assembly (not shown). The flex circuit cable assembly includes a flex circuit cable and a flex clamp. As is typical with present HSA's, the rotary actuator assembly 130 includes a body portion 140 having a pivot bore for receipt of the pivot-bearing cartridge, at least one actuator arm 160 cantilevered from the body portion 140, and a coil portion 150 cantilevered from the body portion 140 in an opposite direction from the actuator arm 160. The actuator arm 160 supports the HGA 110 having a load beam that supports a head 111 for writing and reading data to and from the disk 112. For example, the head can include an inductive head that is used to both read and write data on a recording surface of the disk, or a magnetoresistance (MR) head, which includes an MR head element to read data and an inductive element to write data.

The HSA 120 is pivotally secured to the base 116 via a pivot-bearing cartridge mounted through a pivot bore of the body portion 140 of the HSA 120 forming a pivot axis such that the head 111 at the distal end of the HGA 110 may be moved over a recording surface of the disk. In some embodiments, the body portion 140 of the HSA 120 may be further mounted to the cover 102 by a screw 103 or by other types of fasteners. Further, the storage capacity of the HDA 101 may be increased by the use of additional disks in a disk stack and by the HSA 120 having a vertical stack of HGAs supported by multiple actuator arms.

Although not particularly shown in FIG. 2A, as is known, a voice coil motor (VCM) plate assembly including top and bottom VCM plates may also be mounted to the base. Suitably, one or both of the VCM plates includes a permanent magnet. The coil portion 150 of the actuator assembly 130 is disposed between the top and bottom VCM plates in order to form a voice coil motor to cause the pivoting of the HSA 120 about the pivot axis defined by the pivot bearing cartridge. Thus, the voice coil motor can be used to controllably position the head(s) of the HSA relative to the disk(s) for writing and/or reading data. As should be appreciated, multiple disks and HSA's having multiple HGA's and multiple heads may be utilized in the disk drive 100 having a cover 102, according to embodiments of the present invention, as will now be discussed.

Figure 3:
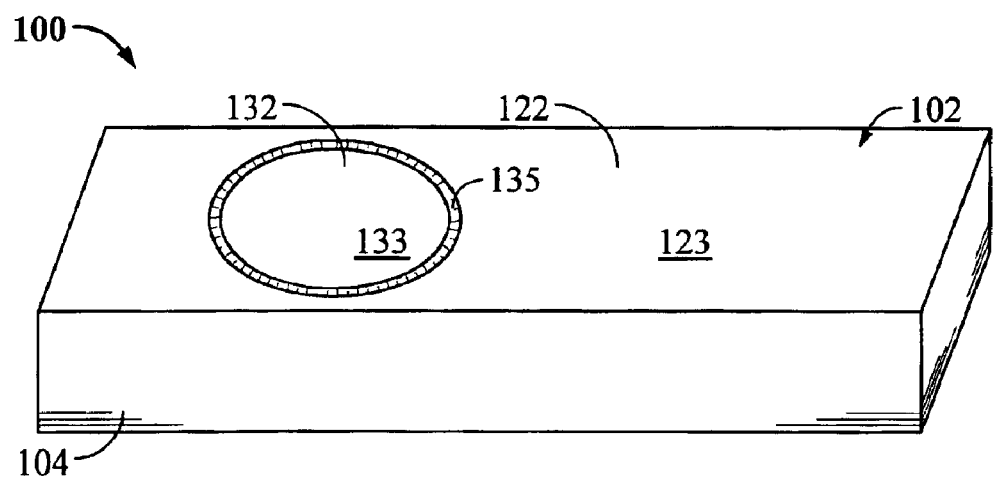
FIG. 3 is a perspective view of the HDD of FIG. 2A having a cover in accordance with one embodiment of the present invention.

Referring now to FIG. 3, which is a perspective view of the HDD 100 of FIG. 2A having a cover 102 in accordance with embodiments of the present invention, in conjunction with FIG. 2A, the cover 102 will now be particularly discussed. Specifically, the cover 102 includes a first portion cover 122 and a second cover portion 132. The first cover portion 122 has a generally planar external side 123 and a generally planar internal side 124. The second cover portion 132 likewise has a generally planar external side 133 and a generally planar internal side 134. Particularly, as can be seen in FIGS. 2A and 3, the second cover portion 132 is recessed relative to the external side 123 of the first cover portion 123. In one embodiment, the recessed second cover portion 132 may be substantially circular shaped. However, it should be appreciated that the recessed second cover portion 132 may be of many different types of shapes. For example, the recessed second cover portion 132 may be substantially polygonal. Further, in some embodiments, a tapered lip 135 may be formed between the first cover portion 122 and the recessed second cover portion 132.

Figure 2B:
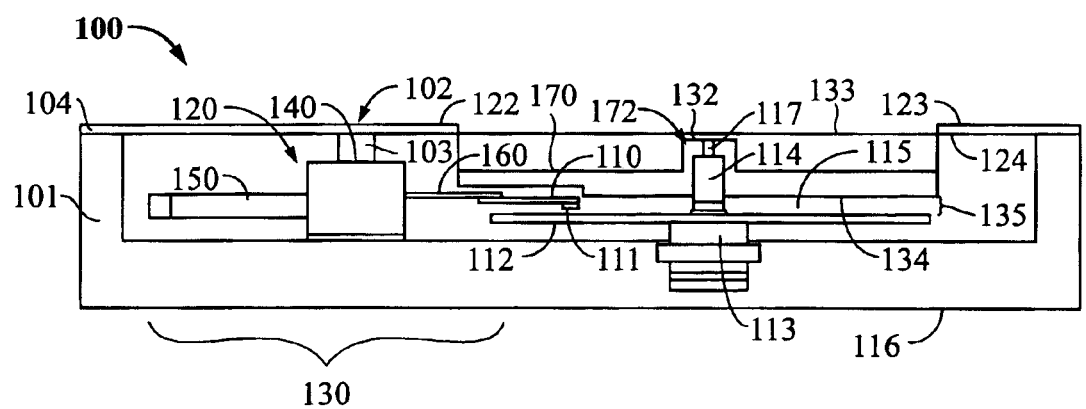
FIG. 2B is a side-sectional view of a hard disk drive (HDD), similar to FIG. 2A, which has a slightly modified cover including an approximately rectangular cutout portion to accommodate an extended spindle shaft that may be mounted to a recessed second cover portion, according to one embodiment of the present invention.

In one embodiment, the recessed second cover portion 132 may be located approximately adjacent to the disk 112 and may be substantially coextensive with the disk 112. Further, the internal side 134 of the recessed second cover portion 132 may be vertically closer to the disk 112 than the internal side 124 of the first cover portion 122. As particularly seen in FIG. 2A, the internal side 134 of the recessed second cover portion 132 is generally planar and coextensive with the disk 112 and includes a slightly elevated portion 170, relative to the rest of the internal side 134 of the recessed second cover portion 132, to accommodate the actuator arm 160. Also, with brief reference to FIG. 2B, it can be seen that in one embodiment of the invention, a slightly modified cover 102 may be utilized having an approximately rectangular cutout portion 172 to accommodate an extended spindle shaft 114 that may be mounted by a screw or other type of faster 117 to the recessed second cover portion 132.

In one embodiment, the internal side 134 of the recessed second cover portion 132 is at a vertical depth sufficient enough to shroud the disk 1112. For example, in one particular embodiment, the external side 133 of the recessed second cover portion 132 may be at least one millimeter vertically distant from the external side 123 of the first cover portion 122. In another particular embodiment, the external side 133 of the recessed second cover portion 132 may be at least two millimeters vertically distant from the external side 123 and the first cover portion 122. As should be apparent, the external side 133 of the recessed second cover portion 132 may be at even larger vertical distances from the external side 123 of the first cover portion 122 dependent upon design considerations; particularly including the allowable vertical distance between the disk 112 and the internal side 134 of the recessed second cover portion.

Advantageously, the recessed second cover portion 132 creates a small gap 135 between the internal side 134 of the recessed second portion 132 of the cover 102 and the disk 112 thereby forming a small channel therebetween to provide for the shrouding of the disk 112. Particularly, in this way, laminar non-turbulent airflow is induced thereby providing for improved air dampening characteristics to aid in suppressing rotating disk and head vibration. Specifically, the small gap may induce laminar non-turbulent airflow about the disk, HSA, and head to suppress rotating disk and head vibration such that undesirable track misregistration (TMR) errors may be minimized. Thus, the cover 102 includes a built-in in shrouding feature, such that additional separator plates or anti-disks are unnecessary.

It should be appreciated that the cover 102 including the first cover portion 122 and the second recessed cover portion 132 may be integrally formed from a metallic material. In one embodiment, the configuration of the cover 102 lends itself to be efficiently manufactured by coining or compression manufacturing techniques and it can be integrally formed from suitable metallic materials such as aluminum or stainless steel. In other embodiments, the configuration of the cover 102 lends itself to be efficiently manufactured by stamping manufacturing techniques and it can be integrally formed from suitable metallic materials such as aluminum or stainless steel. Alternatively, the cover may be non-integrally formed wherein the first cover portion 122 and the second recessed cover portion 132 are separate pieces and are separately formed and the second recessed cover portion 132 is attached to the first cover 122 by suitable methods, such as by an adhesive.

Further, the cover 102 mounted to the base 116 to form a housing of the HDD 100 may be compatible with a small form factor standard. For example, the small form factor standard may be compatible with the Small Form Factor (SFF)-8301 Specification for a Form Factor of 3.5" disk drives.

Before discussing the embodiments of the invention for a cover including heat dissipation features, an example of a conventional disk stack chassis will be discussed. Particularly, FIGS. 4A and 4B illustrate a front and back perspective view, respectively, of an example of a conventional disk stack chassis 402, and FIG. 4C illustrates a front perspective view of a conventional disk bay 404 in which a disk drive 406, having a cover including heat dissipation features (not shown), according to embodiments of the present invention, may be mounted. It should be appreciated that the conventional disk stack chassis 402 is merely shown for explanatory purposes to show how disk drives are commonly mounted and how air flows about them and that the details of the cover having heat dissipation features will be discussed later.

As can be seen in FIGS. 4A–4C, a conventional disk stack chassis 402 vertically stacks a plurality of disk bays 404. A disk drive 406 may be slidably mounted within each disk bay 404. Power supplies may be mounted in the bottom of the disk stack chassis. Further, as should be appreciated, the disk drives 406 may be plugged into circuit boards mounted on a holding plate 410. Particularly, axial-flow fans 412 are installed on the rear panel 414 to induce air-flow (as indicated by air-flow arrow 415) from the front panel 416, passing through the disk bays 404 and over the disk drives 406, and exiting through the rear panel 414 (as indicated by air-flow arrows 422). More particularly, as can be seen in FIGS. 4A and 4C, each disk bay 404 includes vertical slots 426 to allow for air-flow about the disk drive 406. In this way, by air flowing in the disk bay 404 and over the disk drives 406, heat dissipation is induced. However, as previously discussed, for the most part, prior covers and bases for disk drives, by themselves, have not been adequately designed to optimize heat dissipation in order to decrease temperatures within the disk drive.

Various embodiments of the disk drive cover, as previously discussed, now further including heat dissipation features will now be described. Particularly, in some embodiments, the recessed second cover portion may further include at least one member that projects from the external side of the recessed second cover portion to aid in heat dissipation when the disk drive is mounted in a disk bay of a conventional disk stack chassis, as previously discussed, and is subject to air-flow.

Figure 5:
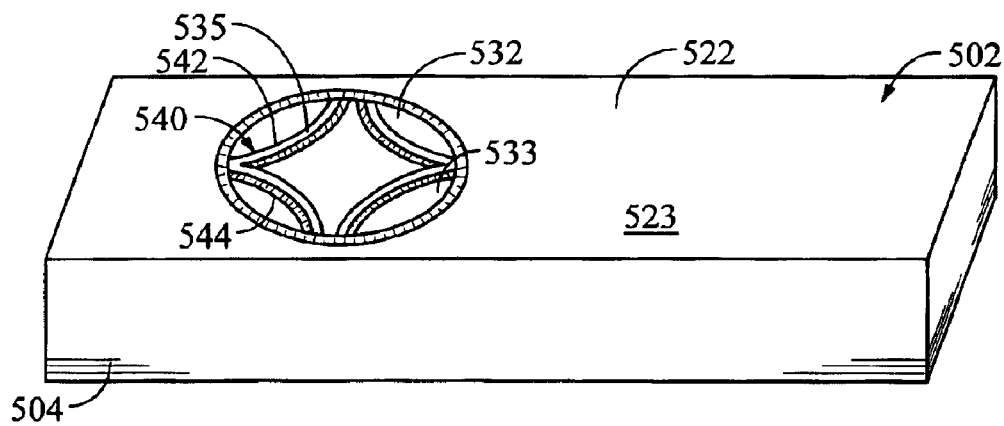
FIG. 5 is a perspective view of a cover having heat dissipation features, according to one embodiment of the present invention.

With reference now to FIG. 5, FIG. 5 shows a perspective view of a cover 502 having heat dissipation features, according to one embodiment of the invention. As shown in FIG. 5, a cover 502 is mounted to a base 504 and includes a first cover portion 522 and a second cover portion 532. The first cover portion 522 has external side 523 and an internal side (not shown). The second cover portion 532 likewise has an external side 533 and an internal side (not shown) and is disposed within the first cover portion 522. As previously discussed, the recessed second cover portion 532 may be located approximately adjacent to the disk inside of the disk drive and may be substantially coextensive with the disk and may be vertically closer to the disk than the internal side of the first cover portion to aid in shrouding.

In this embodiment, the recessed second cover portion 532 may include an approximately arcuate-shaped member 535 to aid in heat dissipation. More particularly, in this embodiment, the recessed second cover portion 532 may include one or more V-shaped members 540, each of which is composed of a pair of arcuate-shaped members 542 and 544, respectively, that project from the external side 533 of the recessed second cover portion 532 to aid in heat dissipation from the disk drive. With his configuration of the cover 502, when the disk drive is mounted in the disk bay of a conventional disk stack chassis and is subject to air-flow as previously discussed, the one or more V-shaped members 540 of the recessed second cover portion 532 provide increased surface area subject to the air-flow to aid in heat dissipation from the disk drive.

Figure 6:
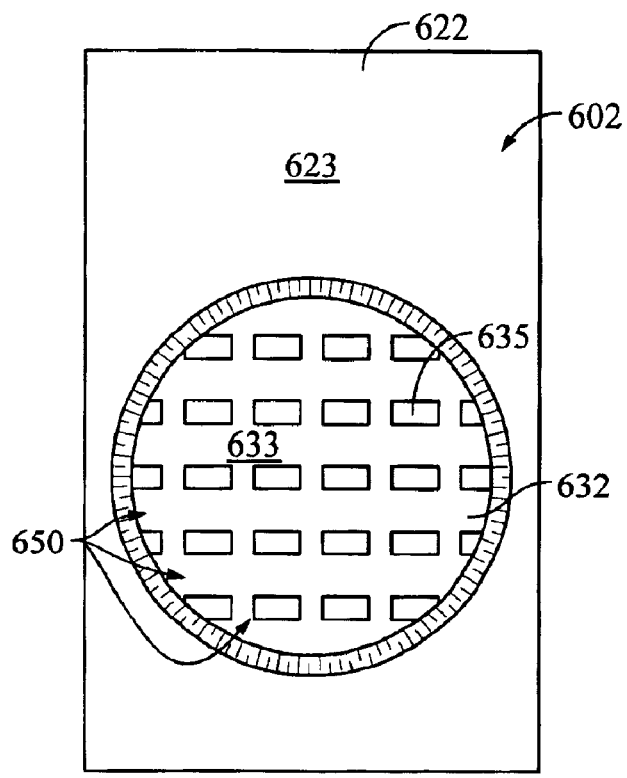
FIG. 6 is a top view of another configuration of a cover having heat dissipation features, according to one embodiment of the present invention.

With reference now to FIG. 6, FIG. 6 shows a top view of another configuration of the cover also having heat dissipation features, according to one embodiment of the invention. As shown in FIG. 6, a cover 602 includes a first cover portion 622 and a second cover portion 632. The first cover portion 622 has an external side 623 and an internal side (not shown). The second cover portion 632 likewise has an external side 633 and an internal side (not shown) and is disposed within the first cover portion 622. As previously discussed, the recessed second cover portion 632 may be located approximately adjacent to the disk inside of the disk drive and may be substantially coextensive with the disk and may be vertically closer to the disk than the internal side of the first cover portion to aid in shrouding.

In this embodiment, the recessed second cover portion 632 may include at least one approximately rectangular-shaped member 635 to aid in heat dissipation. More particularly, in this embodiment, the recessed second cover portion 632 may include a plurality of approximately rectangular-shaped members 635 that project from the external side 633 of the recessed second cover portion 632 to form a plurality of air-flow channels 650 to aid in heat dissipation. With this configuration of the cover 602, when the disk drive is mounted in the disk bay of a conventional disk stack chassis and is subject to air-flow as previously discussed, the plurality of approximately rectangular-shaped members 635 of the recessed second cover portion 632 provide increased surface area subject to the air-flow to aid in heat dissipation from the disk drive.

In further embodiments of the invention, the first cover portion of the cover may include at least one channel having at most the same depth as the recessed second cover portion, wherein the channel extends from a side of the cover to the recessed second cover portion to aid in air-flow about the cover and consequently heat dissipation.

Figure 7:
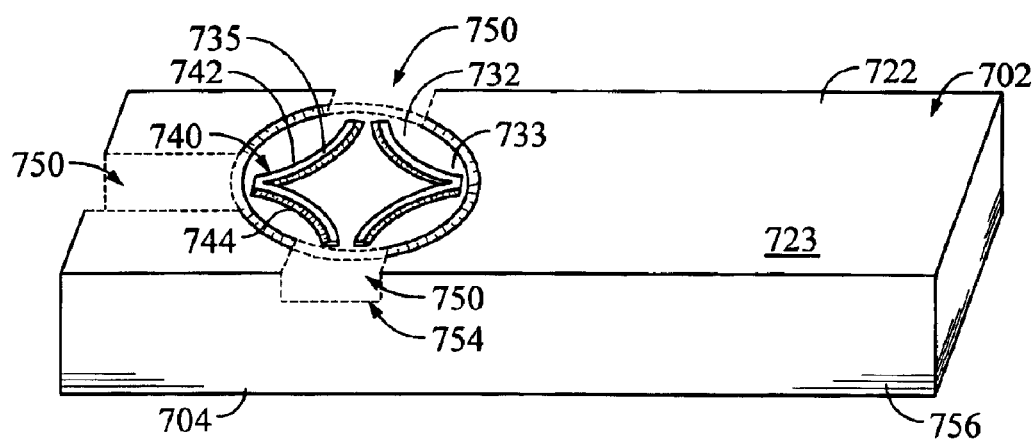
FIG. 7 is a perspective view of a cover having at least one channel to aid in heat dissipation, according to one embodiment of the present invention.

For example, with reference to FIG. 7, FIG. 7 shows a perspective view of a cover 702 having at least one channel 750 to aid in heat dissipation, according to one embodiment of the invention. As shown in FIG. 7, a cover 702 is mounted to a base 704 and includes a first cover portion 722 and a second cover portion 732. The first cover portion 722 has an external side 723 and an internal side (not shown). The second cover portion 732 likewise has an external side 733 and an internal side (not shown) and is disposed within the first cover portion 722. As previously discussed, the recessed second cover portion 732 may be located approximately adjacent to the disk inside of the disk drive and may be substantially coextensive with the disk and may be vertically closer to the disk than the internal side of the first cover portion to aid in shrouding.

In this embodiment, the recessed second cover portion 732 may include an approximately arcuate-shaped member 735 to aid in heat dissipation. More particularly, in this embodiment, the recessed second cover portion 732 may include one or more V-shaped members 740, each of which is composed of a pair of arcuate-shaped members 742 and 744, respectively, that project from the external side 733 of the recessed second cover portion 732 to aid in heat dissipation from the disk drive.

Further, in this embodiment, the external side 723 of the first cover portion 722 includes at least one channel 750 having at most the same depth as the recessed second cover portion 732, wherein the channel 750 extends from a side of the cover 702 to the recessed second cover portion 732 to aid in air-flow to the recessed second cover portion. The channel 750 may be disposed within a respective complementary channel-accommodating slot 754 formed within a respective sidewall 756 of the base 704. In this way, the V-shaped heat dissipation members 740 of the recessed second cover portion 732, through the channel 750, are in air-flow communication with air flowing about the cover 702 and the base 704 to aid in heat dissipation from the disk drive. As should be apparent from FIG. 7, there may be any suitable number of channels 750 formed within the cover 702. With his configuration of the cover 702, when the disk drive is mounted in the disk bay of a conventional disk stack chassis and is subject to air-flow as previously discussed, the one or more V-shaped members 740 of the recessed second cover portion 732 provide increased surface area subject to the air-flow to aid in heat dissipation from the disk drive.

Figure 8:
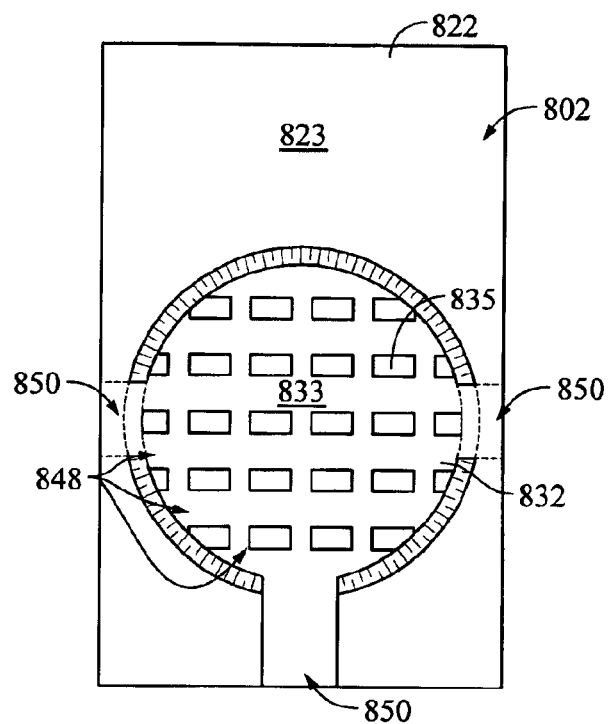
FIG. 8 is a top view of another configuration of a cover similarly having at least one channel to aid in heat dissipation, according to one embodiment of the present invention.

In another example, with reference to FIG. 8, FIG. 8 shows a top view of a cover 802 similarly having at least one channel 850 to aid in heat dissipation, according to one embodiment of the invention. As shown in FIG. 8, a cover 802 mounted to a base includes a first cover portion 822 and a second cover portion 832. The first cover portion 822 has external side 823 and an internal side (not shown). The second cover portion 832 likewise has an external side 833 and an internal side (not shown) and is disposed within the first cover portion 822. As previously discussed, the recessed second cover portion 832 may be located approximately adjacent to the disk inside of the disk drive and may be substantially coextensive with the disk and may be vertically closer to the disk than the internal side of the first cover portion to aid in shrouding.

In this embodiment, the recessed second cover portion 832 may include at least one approximately rectangular-shaped member 835 to aid in heat dissipation. More particularly, in this embodiment, the recessed second cover portion 832 may include a plurality of approximately rectangular-shaped members 835 that project from the external side 833 of the recessed second cover portion 832 to form a plurality of air-flow channels 844 to aid in heat dissipation from the disk drive.

Further, in this embodiment, the external side 823 of the first cover portion 822 includes at least one channel 850 having at most the same depth as the recessed second cover portion 832, wherein the channel 850 extends from a side of the cover 802 to the recessed second cover portion to aid in air-flow to the recessed second cover portion 832. The channel 850 may be disposed within a respective complementary channel-accommodating slot within a respective sidewall of the base such that the plurality of approximately rectangular-shaped members 835 that project from the external side 833 of the recessed second cover portion 832 to form a plurality of air-flow channels 848, through the channel 850, are in air-flow communication with the air flowing about the cover 802 and the base to aid in heat dissipation from the disk drive. As should be apparent from FIG. 8, there may be any suitable number of channels 850 formed within the cover 802. With his configuration of the cover 802, when the disk drive is mounted in the disk bay of a conventional disk stack chassis and is subject to air-flow as previously discussed, the plurality of approximately rectangular-shaped members 835 that project from the external side 833 of the recessed second cover portion 832 to form a plurality of air-flow channels 848 provide increased surface area subject to the air-flow to aid in heat dissipation from the disk drive.

Figure 9:
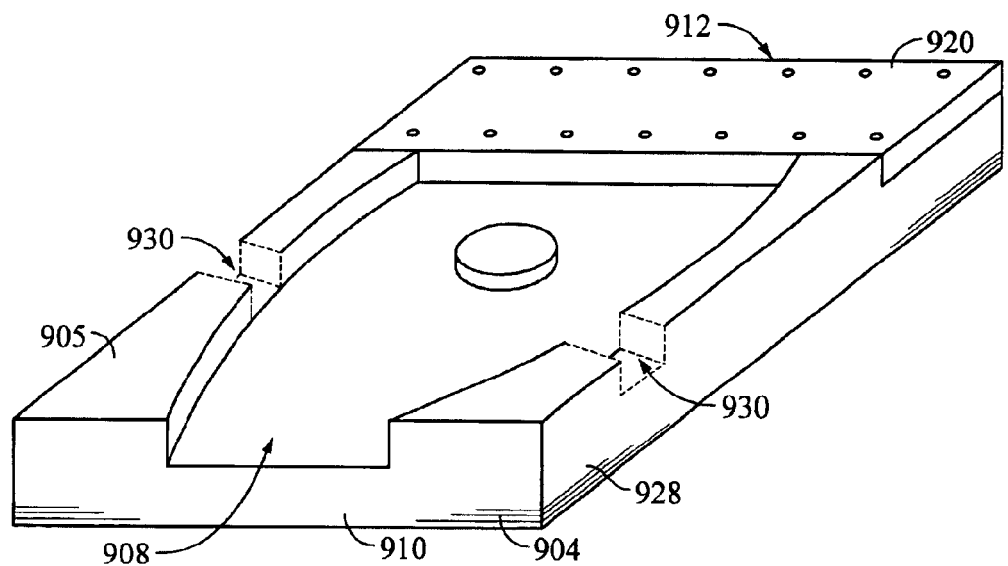
FIG. 9 is a perspective view showing the bottom side of a base having a base channel formed therein, according to one embodiment of the present invention.

In some embodiments, the base may include a bottom side having a base channel formed therein. Turning now to FIG. 9, FIG. 9 is a perspective view showing the bottom side 905 of a base 904 having a base channel 908 formed therein, according to one embodiment of the present invention. The base channel 908 may extend from the front end 910 of the base 904 towards the back end 912 of the base and towards a printed circuit board assembly (PCBA) 920 of the disk drive such that the base channel 908 is in air-flow communication with air flowing about the base from the front end 910 of the base to aid in heat dissipation. Moreover, the bottom side 905 of the base 904 may further include at least one side channel 930 extending from a sidewall 928 of the base to the base channel 908 such that the base channel 908 is in air-flow communication with air flowing about the base from the front end 910 of the base and at least one of the sidewalls 928 of the base 904 to aid in heat dissipation.

It should be appreciated that, in some embodiments, that the heat dissipation members previously discussed with reference to FIGS. 5, 6, 7, and 8 (e.g. arcuate-shaped members 535, 735 and rectangular-shaped members 635, 835) which project from the external side of the recessed second cover portion to aid in heat dissipation may be integrally formed with the recessed second cover portion of the cover. Alternatively, in other embodiments, the heat dissipation members that project from the external side of the recessed second portion to aid in heat dissipation may be attachable to the recessed second cover portion, for example, by an adhesive. Further, the cover mounted to the base to form a housing for the disk drive, including the heat dissipation members previously discussed, may be designed to be compatible with a small form factor standard for disk drives, such as the Small Form Factor (SFF)-8301 Specification for a Form Factor of 3.5" disk drives.

Figure 10:
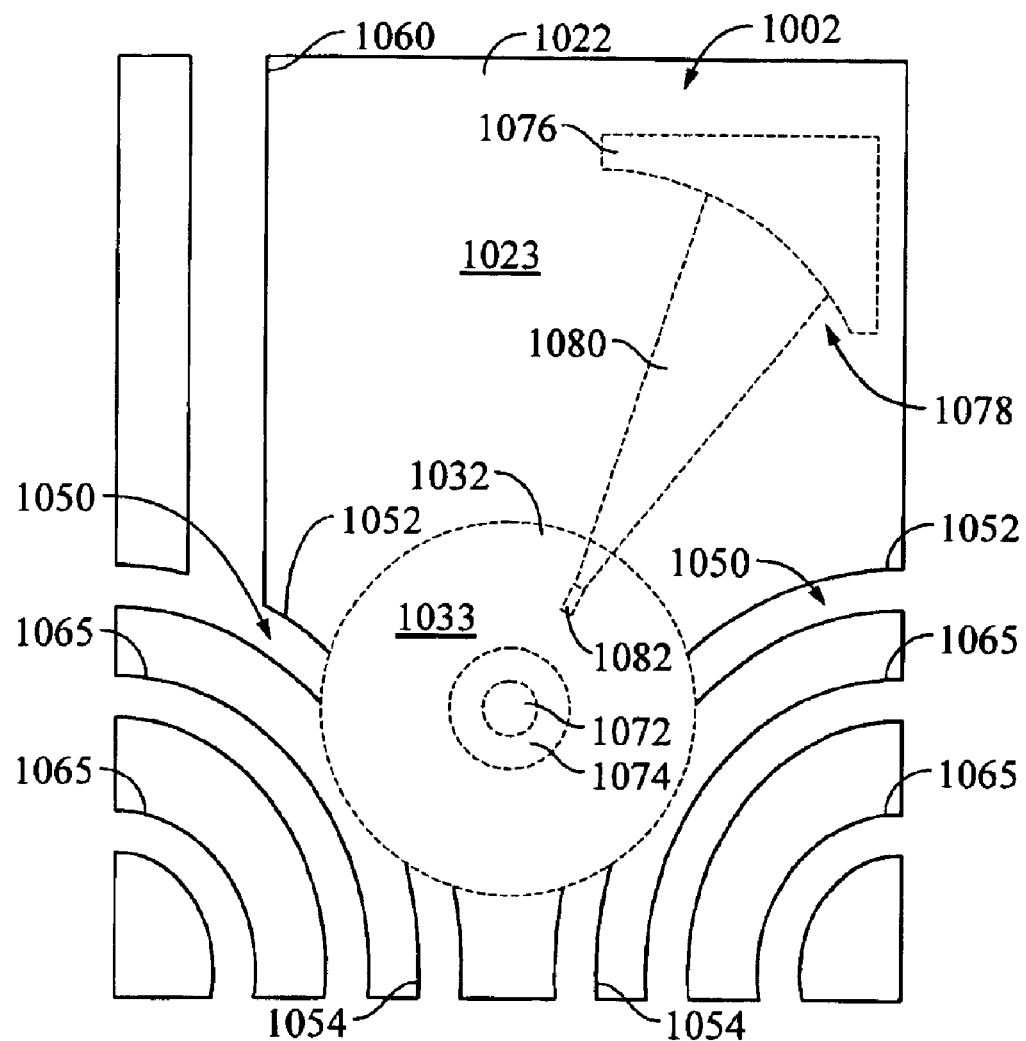
FIG. 10 is a top view of another configuration of a cover to aid in heat dissipation, according to one embodiment of the present invention.

Another embodiment of a cover for use in heat dissipation will now be discussed with reference to FIG. 10. Particularly, FIG. 10 shows a top view of another configuration of a cover 1002 for a disk drive for use in heat dissipation, according to one embodiment of the present invention. The cover 1002 mounts to a base (not shown) and includes a first cover portion 1022 and a second cover portion 1032. The first cover portion 1022 has a generally planar external side 1023 and has a generally planar internal side (not shown). Similarly, the second cover portion 1032 has a generally planar external side 1033 and has a generally planar internal side (not shown) and is disposed within the first cover portion.

Particularly, as with the other embodiments previously discussed, the second cover portion 1032 may be recessed relative to the first cover portion 1022. In one embodiment, the recessed second cover portion 1032 may be substantially circular shaped. However, it should be appreciated that the recessed second cover portion 1032 may be of many different types of shapes. For example, the recessed second cover portion may be substantially polygonal. In one embodiment, the recessed second cover portion 1032 may be located approximately adjacent to the disk of the disk drive and may be substantially coextensive with the disk.

As with the other embodiments previously discussed, the internal side of the recessed second cover portion 1032 may be vertically closer to the disk than the internal side of the first cover portion to provide shrouding for the disk of the disk drive, as previously discussed. However, it should be appreciated that the shrouding feature does not need to implemented with the embodiment of the cover 1002 of FIG. 10, and thus, in some embodiments of the cover 1002 of FIG. 10, the recessed second cover portion 1032 is not vertically closer to the disk than the internal side of the first cover portion and does not provide shrouding. As should be noted, FIG. 10 shows some of the internal components of the disk drive in phantom, including: a spindle 1072, a spindle motor 1074, a voice coil motor plate 1076, and a head stack assembly (HSA) 1078 including an actuator arm 1080 and a head gimbal assembly (HGA) 1082.

When shrouding is provided, as with the other embodiments previously discussed, the internal side of the recessed second cover portion 1032 is generally planar and coextensive with the disk and includes a slightly elevated portion, relative to the rest of the internal side of the recessed second cover portion, to accommodate the actuator arm. Further, the internal side of the recessed second cover portion 1032 is at a vertical depth sufficient enough to shroud the disk. Particular embodiments of this have been previously discussed, and will not be repeated for brevity's sake. Advantageously, in this embodiment, the recessed second cover portion 1032 creates a small gap between the internal side of the recessed second portion of the cover and the disk thereby forming a small channel therebetween to provide for shrouding of the disk. Particularly, in this way, laminar non-turbulent airflow is induced thereby providing for improved air-dampening characteristics to aid in suppressing rotating disk and head vibration. Specifically, the small gap may induce laminar non-turbulent airflow about the about the disk, HSA, and head to suppress rotating disk and head vibration such that undesirable track misregistration (TMR) errors may be minimized. Thus, the cover 1032, in some embodiments, may include a built-in shrouding feature, such that additional separator plates or anti-disks are unnecessary.

Particularly, as shown in FIG. 10, the external side 1023 of the first cover portion 1022 may include a plurality of channels 1050 formed within the first cover portion 1022. Examples of these channels 1052, 1054, and 1065 are particularly shown in FIG. 10. The plurality of channels 1052, 1054, and 1065 may have at most the same depth as the recessed second cover portion 1032. More particularly, some of the channels 1052 and 1054 may extend from a side of the cover 1002 to the recessed second cover portion 1032 and may be disposed within a respective complementary channel-accommodating slot formed within a respective sidewall of the base (as previously discussed in detail in relation to the other embodiments of the cover). For example, in one embodiment, channels may be formed in the first cover portion 1022, such as channels 1052 and 1054 that extend from different sides of the covers, to create at least two different channels (e.g. channels 1052 and 1054), such that the recessed second cover portion 1032 is in air-flow communication with air flowing about the cover and base from at least two different sides of the cover through at least two different channels (e.g. channels 1052 and 1054) to aid in heat dissipation from the disk drive.

Further, as shown in FIG. 10, other channels connecting different sides of the cover to one another (e.g. channels 1065) may also be formed in the first cover portion 1022 of the cover 1002 and may be disposed within a respective complementary channel-accommodating slot formed within a respective sidewall of the base (as previously discussed in detail in relation to the other embodiments of the cover) to aid in heat dissipation from the disk drive. In some embodiments, some of the channels 1065 may extend between different sides of the cover but not through the recessed second cover portion 1032. Moreover, in some embodiments, a back end channel 1060 may be coupled to one of the channels (e.g. channel 1052). Similarly, the back end channel may be disposed within a complementary back end channel-accommodating slot formed within the back end sidewall of the base.

It should be appreciated that the cover 1002 may, in some embodiments, be utilized with the base 904, previously discussed with reference to FIG. 9. Also, it should be appreciated that the cover 1002 including the first cover portion 1022 and the second recessed cover portion 1032 may be integrally formed from a metallic material. In one embodiment, the configuration of the cover 1002 lends itself to be efficiently manufactured by coining or compression manufacturing techniques and it can be integrally formed from suitable metallic materials such as aluminum or stainless steel. In other embodiments, the configuration of the cover 1002 lends itself to be efficiently manufactured by stamping manufacturing techniques and it can be integrally formed from suitable metallic materials such as aluminum or stainless steel. Alternatively, the cover may be non-integrally formed wherein the first cover portion 1022 and the second recessed cover portion 1032 are separate pieces and are separately formed and the second recessed cover portion 1032 is attached to the first cover 1022 by suitable methods, such as by an adhesive. Further, the cover 1002 mounted to the base to form a housing of the HDD may be compatible with a small form factor standard. For example, the small form factor standard may be compatible with the Small Form Factor (SFF)-8301 Specification for a Form Factor of 3.5" disk drives.

Also it should be appreciated that the cover 1002 of FIG. 10, having all of the previously described channels formed therein, may further be utilized with any of the various heat dissipation members of the recessed second cover portion, as previously discussed with reference to FIGS. 5, 6, 7, and 8; such that a disk drive with cover 1002, including these types of heat dissipation features, is suitable for use in a conventional disk stack chassis of the type previously discussed with reference to FIGS. 4A–4C, which is subject to air-flow about the cover and base. The details of FIGS. 4A–4C, have been previously discussed and will not be repeated for brevity's sake.

Accordingly, various embodiments of the disk drive cover 1002, as previously discussed, further including heat dissipation features will now be briefly described. Particularly, in some embodiments, the recessed second cover portion 1032 of cover 1002 may further include at least one member that projects from the external side 1033 of the recessed second cover portion 1032 to aid in heat dissipation.

Particularly, as previously discussed with reference FIG. 5, in one embodiment the recessed second cover portion 1032 of the cover 1002 may include one or more V-shaped members, each of which is composed of a pair of arcuate-shaped members, respectively, that project from the external side 1033 of the recessed second cover portion 1032 to aid in heat dissipation from the disk drive (as can be seen in FIG. 5). When the disk drive is mounted in the disk bay of a conventional disk stack chassis and is subject to air-flow as previously discussed, the one or more V-shaped members of the recessed second cover portion 1032, in conjunction with all of the previously described channels formed within the first cover portion 1022 of the cover 1032, results in increased air-flow about the cover and increased air-flow about the V-shaped members to aid in heat dissipation from the disk drive. Further, as previously discussed with reference FIG. 6, in one embodiment, the recessed second cover portion 1032 of cover 1002 may include at least one approximately rectangular-shaped member to aid in heat dissipation. More particularly, in one embodiment, the recessed second cover portion 1032 may include a plurality of approximately rectangular-shaped members that project from the external side 1033 of the recessed second cover portion 1032 to form a plurality of air-flow channels to aid in heat dissipation (as can be seen in FIG. 6). When the disk drive is mounted in the disk bay of a conventional disk stack chassis and is subject to air-flow as previously discussed, the plurality of approximately rectangular-shaped members and the air-flow channels, in conjunction with all of the previously described channels formed within the first cover portion 1022 of the cover 1032, results in increased air-flow about the cover and increased air-flow about the rectangular-shaped members, and through the air-flow channels formed thereby, to aid in heat dissipation from the disk drive.

It should be appreciated that, in some embodiments, that the heat dissipation members previously discussed with reference to FIGS. 5 and 6 (e.g. arcuate-shaped members 535 and rectangular-shaped members 635) that may project from the external side 1033 of the recessed second cover portion 1032 to aid in heat dissipation may be integrally formed with the recessed second cover portion of the cover. Alternatively, in other embodiments, the heat dissipation members that project from the external side of the recessed second portion to aid in heat dissipation may be attachable to the recessed second cover portion, for example, by an adhesive. Further, the cover mounted to the base to form a housing for the disk drive, including the heat dissipation members previously discussed, may still designed to be compatible with a small form factor standard for disk drives, such as the Small Form Factor (SFF)-8301 Specification for a Form Factor of 3.5" disk drives.

It should be appreciated that other modifications and embodiments will occur to those of skill in this art and all such modifications and other embodiments are deemed to fall within the scope of the present invention.

We claim:

1. A cover for use in a disk drive, the disk drive including the cover, a base, at least one disk mounted to a spindle motor for rotation within the disk drive, and a head stack assembly (HSA) including an actuator assembly pivotally coupled to the base of the disk drive to support at least one head for writing and reading data to and from the at least one disk, the cover for mounting to the base, the cover comprising:

a first cover portion having an external side and an internal side; and a second cover portion having an external side and an internal side disposed within the first cover portion, the second cover portion being recessed relative to the first cover portion, the recessed second cover portion being located approximately adjacent to the at least one disk and being substantially coextensive with the at least one disk, the internal side of the recessed second cover portion facing the at least one disk and being closer to the at least one disk than the internal side of the first cover portion.

2. The cover of claim 1, wherein the recessed second cover portion is substantially circular.

3. The cover of claim 1, wherein the recessed second cover portion is substantially polygonal.

4. The cover of claim 1, wherein the internal side of the recessed second cover portion is at a vertical depth sufficient enough to shroud the at least one disk.

5. The cover of claim 1, wherein the external side of the recessed second cover portion is at least one millimeter vertically distant from the external side of the first cover portion.

6. The cover of claim 1, wherein the external side of the recessed second cover portion is at least two millimeters vertically distant from the external side of the first cover portion.

7. The cover of claim 1, wherein the recessed second cover portion further includes at least one member that projects from the external side of the recessed second cover portion to aid in heat dissipation.

8. The cover of claim 1, wherein the base includes a bottom side having a base channel formed therein, the base channel extending from a front end of the base towards a back end of the base and a printed circuit board assembly (PCBA) of the disk drive such that the base channel is in air-flow communication with air flowing about the base from at least the front end of the base to aid in heat dissipation.

9. The cover of claim 1, wherein the cover mounted the base to form a housing of the disk drive is compatible with a small form factor standard.

10. The cover of claim 7, wherein the at least one member includes an approximately arcuate-shaped member to aid in heat dissipation.

11. The cover of claim 7, wherein the at least one member includes an approximately rectangular-shaped member to aid in heat dissipation.

12. The cover of claim 7, wherein a plurality of approximately rectangular-shaped members project from the external side of the recessed second cover portion to form a plurality of air-flow channels to aid in heat dissipation.

13. The cover of claim 7, wherein the external side of the first cover portion includes at least one channel having at most the same depth as the recessed second cover portion, the channel extending from a side of the cover to the recessed second cover portion, the channel further being disposed within a respective complementary channel-accommodating slot formed within a respective sidewall of the base, such that the at least one member of the recessed second cover portion, through the at least one channel, is in air-flow communication with air flowing about the cover and base to aid in heat dissipation.

14. The cover of claim 7, wherein the at least one member that projects from the external side of the recessed second cover portion to aid in heat dissipation is integrally formed with the recessed second cover portion.

15. The cover of claim 7, wherein the at least one member that projects from the external side of the recessed second cover portion to aid in heat dissipation is attachable to the recessed second cover portion.

16. The cover of claim 8, wherein the bottom side of the base further includes at least one side channel extending from a sidewall of the base to the base channel such that the base channel is in air-flow communication with air flowing about the base from at least the front end of the base and at least one of the sides of the base to aid in heat dissipation.

17. The cover of claim 12, wherein the external side of the first cover portion includes at least one channel having at most the same depth as the recessed second cover portion, the channel extending from a side of the cover to the recessed second cover portion, the channel further being disposed within a respective complementary channel-accommodating slot formed within a respective sidewall of the base, such that the plurality of approximately rectangular-shaped members of the recessed second cover portion, through the at least one channel, is in air-flow communication with air flowing about the cover and base to aid in heat dissipation.

18. A cover for use in a disk drive, the disk drive including the cover, a base, at least one disk mounted to a spindle motor for rotation within the disk drive, and a head stack assembly (HSA) including an actuator assembly pivotally coupled to the base of the disk drive to support at least one head for writing and reading data to and from the at least one disk, the cover for mounting to the base, the cover comprising:

a first cover portion having an external side and an internal side; and a second cover portion having an external side and an internal side disposed within the first cover portion, the second cover portion being recessed relative to the first cover portion, the recessed second cover portion being located approximately adjacent to the at least one disk and being substantially coextensive with the at least one disk;

wherein the external side of the first cover portion includes a plurality of channels having at most the same depth as the recessed second cover portion, each channel extending from a side of the cover to the recessed second cover portion, each channel further being disposed within a respective complementary channel-accommodating slot formed within a respective sidewall of the base, respectively, wherein at least one of the channels extends from a different side of the cover than one of the other channels to create at least two different channels, such that the second recessed cover portion is in air-flow communication with air flowing about the cover from at least two different sides of the cover through the at least two different channels to aid in heat dissipation.

19. The cover of claim 18, wherein the recessed second cover portion is substantially circular.

20. The cover of claim 18, wherein the recessed second cover portion is substantially polygonal.

21. The cover of claim 18, further comprising a back end channel coupled to one of the at least two different channels, the back end channel further being disposed within a complementary back end channel-accommodating slot formed within a back end sidewall of the base.

22. The cover of claim 18, wherein one of the channels extends between different sides of the cover but not through the recessed second cover portion.

23. The cover of claim 18, wherein the base includes a bottom side having a base channel formed therein, the base channel extending from a front end of the base towards a back end of the base and a printed circuit board assembly (PCBA) of the disk drive such that the base channel is in air-flow communication with air flowing about the base from at least the front end of the base to aid in heat dissipation.

24. The cover of claim 18, wherein the recessed second cover portion further includes at least one member that projects from the external side of the recessed second cover portion to aid in heat dissipation.

25. The cover of claim 18, wherein the cover mounted the base to form a housing of the disk drive is compatible with a small form factor standard.

26. The cover of claim 23, wherein the bottom side of the base further includes at least one side channel extending from a sidewall of the base to the base channel such that the base channel is in air-flow communication with air flowing about the base from at least the front end of the base and at least one of the sides of the base to aid in heat dissipation.

27. The cover of claim 24, wherein the at least one member includes an approximately arcuate-shaped member to aid in heat dissipation.

28. The cover of claim 24, wherein the at least one member includes an approximately rectangular-shaped member to aid in heat dissipation.

29. The cover of claim 24, wherein a plurality of approximately rectangular-shaped members project from the external side of the recessed second cover portion to form a plurality of air-flow channels to aid in heat dissipation.

30. The cover of claim 24, wherein the at least one member that projects from the external side of the recessed second cover portion to aid in heat dissipation is integrally formed with the recessed second cover portion.

31. The cover of claim 24, wherein the at least one member that projects from the external side of the recessed second cover portion to aid in heat dissipation is attachable to the recessed second cover portion.

32. A disk drive comprising:

a base;

a cover mounted to the base;

at least one disk mounted to a spindle motor for rotation within the disk drive; and a head stack assembly (HSA) including an actuator assembly pivotally coupled to the base of the disk drive to support a head gimbal assembly (HGA) having at least one head for writing and reading data to and from the at least one disk;

wherein, the cover includes:

a first cover portion having an external side and an internal side; and a second cover portion having an external side and an internal side disposed within the first cover portion, the second cover portion being recessed relative to the first cover portion, the recessed second cover portion being located approximately adjacent to the at least one disk and being substantially coextensive with the at least one disk, the internal side of the recessed second cover portion facing the at least one disk and being closer to the at least one disk than the internal side of the first cover portion.

33. The disk drive of claim 32, wherein the recessed second cover portion is substantially circular.

34. The disk drive of claim 32, wherein the recessed second cover portion is substantially polygonal.

35. The disk drive of claim 32, wherein the internal side of the recessed second cover portion is at a vertical depth sufficient enough to shroud the at least one disk.

36. The disk drive of claim 32, wherein the external side of the recessed second cover portion is at least one millimeter vertically distant from the external side of the first cover portion.

37. The disk drive of claim 32, wherein the external side of the recessed second cover portion is at least two millimeters vertically distant from the external side of the first cover portion.

38. The disk drive of claim 32, wherein the recessed second cover portion further includes at least one member that projects from the external side of the recessed second cover portion to aid in heat dissipation.

39. The disk drive of claim 32, wherein the base includes a bottom side having a base channel formed therein, the base channel extending from a front end of the base towards a back end of the base and a printed circuit board assembly (PCBA) of the disk drive such that the base channel is in air-flow communication with air flowing about the base from at least the front end of the base to aid in heat dissipation.

40. The disk drive of claim 32, wherein the cover mounted the base to form a housing of the disk drive is compatible with a small form factor standard.

41. The disk drive of claim 38, wherein the at least one member includes an approximately arcuate-shaped member to aid in heat dissipation.

42. The disk drive of claim 38, wherein the at least one member includes an approximately rectangular-shaped member to aid in heat dissipation.

43. The disk drive of claim 38, wherein a plurality of approximately rectangular-shaped members project from the external side of the recessed second cover portion to form a plurality of air-flow channels to aid in heat dissipation.

44. The disk drive of claim 38, wherein the external side of the first cover portion includes at least one channel having at most the same depth as the recessed second cover portion, the channel extending from a side of the cover to the recessed second cover portion, the channel further being disposed within a respective complementary channel-accommodating slot formed within a respective sidewall of the base, such that the at least one member of the recessed second cover portion, through the at least one channel, is in air-flow communication with air flowing about the cover and base to aid in heat dissipation.

45. The disk drive of claim 38, wherein the at least one member that projects from the external side of the recessed second cover portion to aid in heat dissipation is integrally formed with the recessed second cover portion.

46. The disk drive of claim 38, wherein the at least one member that projects from the external side of the recessed second cover portion to aid in heat dissipation is attachable to the recessed second cover portion.

47. The disk drive of claim 39, wherein the bottom side of the base further includes at least one side channel extending from a sidewall of the base to the base channel such that the base channel is in air-flow communication with air flowing about the base from at least the front end of the base and at least one of the sides of the base to aid in heat dissipation.

48. The disk drive of claim 43, wherein the external side of the first cover portion includes at least one channel having at most the same depth as the recessed second cover portion, the channel extending from a side of the cover to the recessed second cover portion, the channel farther being disposed within a respective complementary channel-accommodating slot formed within a respective sidewall of the base, such that the plurality of approximately rectangular-shaped members of the recessed second cover portion, through the at least one channel, is in air-flow communication with air flowing about the cover and base to aid in heat dissipation.

49. A disk drive comprising:
   a base;
   a cover mounted to the base;
   at least one disk mounted to a spindle motor for rotation within the disk drive; and
   a head stack assembly (HSA) including an actuator assembly pivotally coupled to the base of the disk drive to support a head gimbal assembly (HGA) having at least one head for writing and reading data to and from the at least one disk;
   wherein, the cover includes:
      a first cover portion having an external side and an internal side; and
      a second cover portion having an external side and an internal side disposed within the first cover portion, the second cover portion being recessed relative to the first cover portion, the recessed second cover portion being located approximately adjacent to the at least one disk and being substantially coextensive with the at least one disk, wherein the external side of the first cover portion includes a plurality of channels having at most the same depth as the recessed second cover portion, each channel extending from a side of the cover to the recessed second cover portion, each channel further being disposed within a respective complementary channel-accommodating slot formed within a respective sidewall of the base, respectively, wherein at least one of the channels extends from a different side of the cover than one of the other channels to create at least two different channels, such that the second recessed cover portion is in air-flow communication with air flowing about the cover from at least two different sides of the cover through the at least two different channels to aid in heat dissipation.

50. The disk drive of claim 49, wherein the recessed second cover portion is substantially circular.

51. The disk drive of claim 49, wherein the recessed second cover portion is substantially polygonal.

52. The disk drive of claim 49, further comprising a back end channel coupled to one of the at least two different channels, the back end channel further being disposed within a complementary back end channel-accommodating slot formed within a back end sidewall of the base.

53. The disk drive of claim 49, wherein one of the channels extends between different sides of the cover but not through the recessed second cover portion.

54. The disk drive of claim 49, wherein the base includes a bottom side having a base channel formed therein, the base channel extending from a front end of the base towards a back end of the base and a printed circuit board assembly (PCBA) of the disk drive such that the base channel is in air-flow communication with air flowing about the base from at least the front end of the base to aid in heat dissipation.

55. The disk drive of claim 49, wherein the recessed second cover portion further includes at least one member that projects from the external side of the recessed second cover portion to aid in heat dissipation.

56. The disk drive of claim 49, wherein the cover mounted the base to form a housing of the disk drive is compatible with a small form factor standard.

57. The disk drive of claim 54, wherein the bottom side of the base further includes at least one side channel extending from a sidewall of the base to the base channel such that the base channel is in air-flow communication with air flowing about the base from at least the front end of the base and at least one of the sides of the base to aid in heat dissipation.

58. The disk drive of claim 55, wherein the at least one member includes an approximately arcuate-shaped member to aid in heat dissipation.

59. The disk drive of claim 55, wherein the at least one member includes an approximately rectangular-shaped member to aid in heat dissipation.

60. The disk drive of claim 55, wherein a plurality of approximately rectangular-shaped members project from the external side of the recessed second cover portion to form a plurality of air-flow channels to aid in heat dissipation.

61. The disk drive of claim 55, wherein the at least one member that projects from the external side of the recessed second cover portion to aid in heat dissipation is integrally formed with the recessed second cover portion.

62. The disk drive of claim 55, wherein the at least one member that projects from the external side of the recessed second cover portion to aid in heat dissipation is attachable to the recessed second cover portion.

* * * * *